Jan. 28, 1936. W. F. CERVENKA ET AL 2,029,155
IMPLEMENT FOR REMOVING WEEDS AND THE LIKE
Filed Sept. 11, 1935
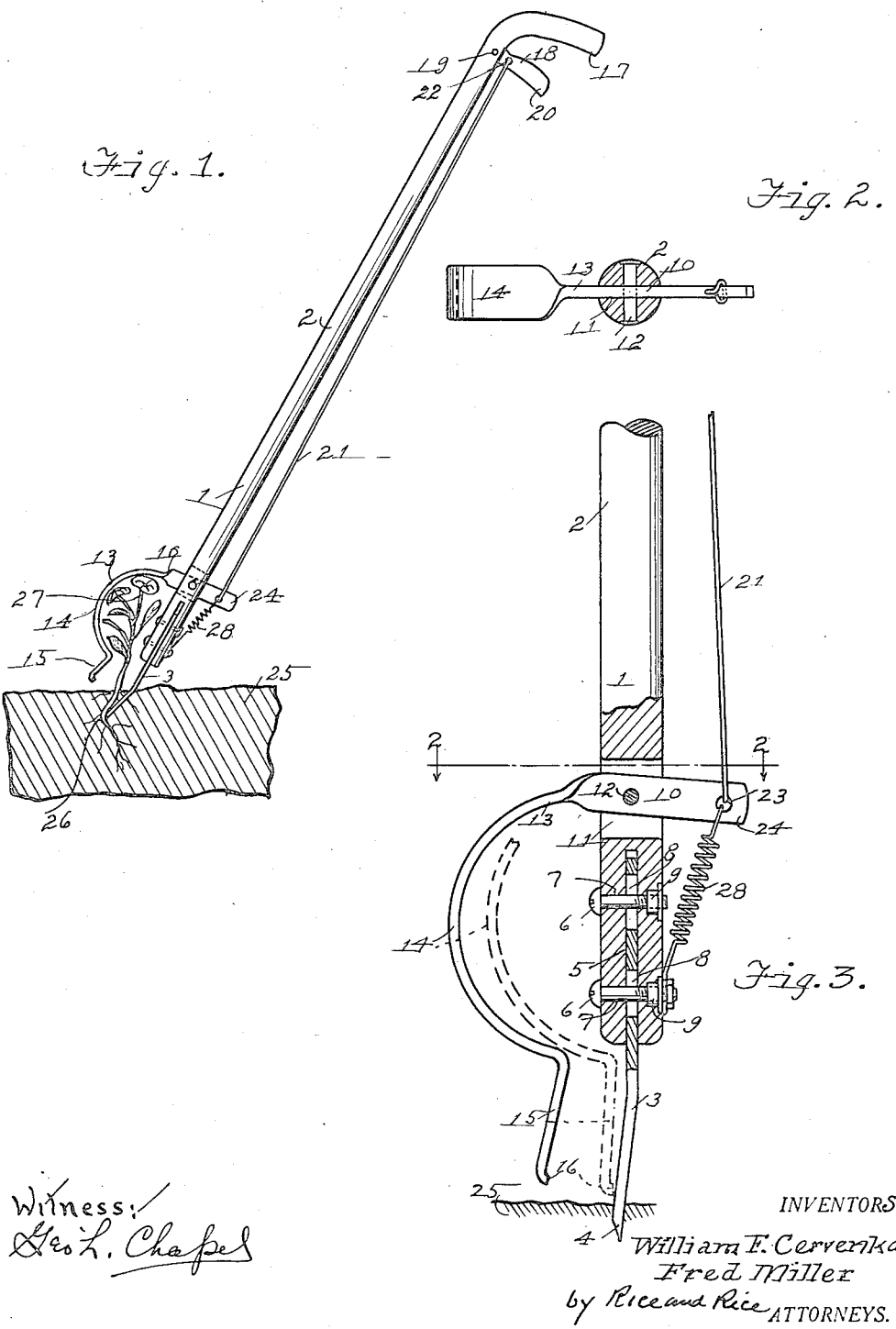
INVENTORS:
William F. Cervenka
Fred Miller
by Rice and Rice ATTORNEYS.

Patented Jan. 28, 1936

2,029,155

UNITED STATES PATENT OFFICE 2,029,155

IMPLEMENT FOR REMOVING WEEDS AND THE LIKE

William F. Cervenka and Fred Miller, Traverse City, Mich.

Application September 11, 1935, Serial No. 40,021

6 Claims. (Cl. 55—148)

The present invention relates to horticultural implements, particularly implements for removing weeds and the like; and its object is to provide such an implement which shall be simple and economical in construction, very effective, and easily operated manually.

This and any other and more specific objects hereinafter appearing are attained by, and the invention finds preferable embodiment in, the illustrative implement particularly described in the body of this specification and illustrated by the accompanying drawing, in which:

Figure 1 is a side view of a horticultural implement for removing weeds and the like;

Figure 2 is a transverse sectional enlarged view of the same taken on line 2—2 of Figure 3;

Figure 3 is a side view of the lower portion thereof partially sectioned longitudinally.

In the embodiment of the invention illustrated by the drawing, an implement is shown comprising an elongated member designated generally 1 including a body part 2 desirably a round wooden rod and a lower part which is a tool 3 of chisel form with a sharp bottom 4. This tool is shown mounted in a longitudinal slot 5 in the lower end of said body part and is slidable therein to desired adjusted positions in which it is releasably held by screw bolts 6 extending through holes 7 in the body part and longitudinal slots 8 in the tool and having nuts 9 seated in depressions in said body part. A lever 10 extends through a slot 11 in said body part and is fulcrumed thereon at 12. One arm 13 of this lever extends from the fulcrum in a form first bowed outwardly at 14, then radially at 15 and at its free lower end 16 extending at right angles to the tool in the closed together position of said arm and tool indicated in the dotted line position of said arm in Figure 3.

The body part 2 is turned laterally at its upper end to form a handle portion 17, and adjacent thereto a member 18 is pivotally mounted at 19 on the body part and has a handle portion 20, both handle portions 17, 20 being adapted to be grasped in one hand of the operator. Suitable connections, as the rod 21 connected at 22 to member 18 and at 23 to the other arm 24 of said lever, are provided for turning the lever's arm 13 toward said elongated member, i. e. its tool 3, by the mutually approaching movement of said handle portions 17, 20 when grasped by the operator.

The implement is operated in the following manner. The tool having been adjusted to the position in the slot 5 corresponding to the depth in the earth 25 at which it is desired to sever the root 26 of the plant and having been clamped in such adjusted position by turning the screw bolts 6, the tool is thrust into the earth as shown in Figure 1 and moved to sever the plant root, and the handle portions 17, 20 are pressed together to move the lever's arm 13 toward the tool and grip the plant above the ground between the tool and the arm's portion 15, the arm's extremity 16 pressing into the plant to more securely grip the same. In this position of the parts, the upper portions 27 of a lower or short plant are received between the tool and the arm's portion 14 bowed outwardly therefrom.

The implement is now withdrawn carrying the severed plant with it which is released by the spring 28 when the handle portions 17, 20 are released from their pressed-together position.

The invention being intended to be pointed out in the claims, is not to be limited to or by details of construction and arrangement of the particular embodiment thereof illustrated by the drawing or hereinbefore described.

We claim:

1. A horticultural implement comprising, in combination: an elongated member including a body part having at its upper end a handle portion and a lower part consisting of a cutting tool of chisel form adapted to be thrust endwise into the earth to sever a plant therein; a lever fulcrumed on the elongated member adjacent the tool, having an arm adapted in one turned position of the lever to grip the plant between said arm and the elongated member; a member movably mounted on the elongated member adjacent its upper end and having a handle portion, said handle portions being adapted to be grasped by the operator; connections extending between the movably mounted member and the lever for moving said arm toward the elongated member to grip the plant, by the mutually approaching movement of said handle portions.

2. A horticultural implement comprising, in combination: an elongated member including a body part having at its upper end a handle portion and a lower part consisting of a cutting tool of chisel form adapted to be thrust endwise into the earth to sever a plant therein; a lever fulcrumed on the elongated member adjacent the tool, having an arm adapted in one turned position of the lever to grip the plant between said arm and the elongated member; a member movably mounted on the elongated member adjacent its upper end and having a handle portion, said handle portions being adapted to be grasped by the operator; connections extending between the movably mounted member and the lever for moving said arm toward the elongated member to grip the plant, by the mutually approaching movement of said handle portions; a spring urging said arm from the elongated member.

3. A horticultural implement comprising, in combination: an elongated member including a body part having at its upper end a handle portion and a lower part consisting of a cutting tool of chisel form adapted to be thrust endwise into the earth to sever a plant therein; a lever fulcrumed on the elongated member adjacent the tool, having an arm adapted in one turned position of the lever to grip the plant between said arm and the elongated member; a member movably mounted on the elongated member adjacent its upper end and having a handle portion, said handle portions being adapted to be grasped by the operator; connections extending between the movably mounted member and the lever for moving said arm toward the elongated member to grip the plant, by the mutually approaching movement of said handle portions, said arm having a medial portion bowed outwardly from the elongated member.

4. A horticultural implement comprising, in combination: an elongated member including a body part having at its upper end a handle portion and a lower part consisting of a cutting tool of chisel form adapted to be thrust endwise into the earth to sever a plant therein; a lever fulcrumed on the elongated member adjacent the tool, having an arm adapted in one turned position of the lever to grip the plant between said arm and the elongated member; a member movably mounted on the elongated member adjacent its upper end and having a handle portion, said handle portions being adapted to be grasped by the operator; connections extending between the movably mounted member and the lever for moving said arm toward the elongated member to grip the plant, by the mutually approaching movement of said handle portions, said arm having a radially extending portion adjacent its free end.

5. A horticultural implement comprising, in combination: an elongated member including a body part having at its upper end a handle portion and a lower part consisting of a cutting tool of chisel form adapted to be thrust endwise into the earth to sever a plant therein; a lever fulcrumed on the elongated member adjacent the tool, having an arm adapted in one turned position of the lever to grip the plant between said arm and the elongated member; a member movably mounted on the elongated member adjacent its upper end and having a handle portion, said handle portions being adapted to be grasped by the operator; connections extending between the movably mounted member and the lever for moving said arm toward the elongated member to grip the plant, by the mutually approaching movement of said handle portions, the free end of said arm extending in a direction at right angles to the tool in the closed together position of the arm and the tool.

6. A horticultural implement comprising, in combination: an elongated member including a body part having at its upper end a handle portion and a lower part consisting of a cutting tool of chisel form adapted to be thrust endwise into the earth to sever a plant therein; a lever fulcrumed on the elongated member adjacent the tool, having an arm adapted in one turned position of the lever to grip the plant between said arm and the elongated member; a member movably mounted on the elongated member adjacent its upper end and having a handle portion, said handle portions being adapted to be grasped by the operator; connections extending between the movably mounted member and the lever for moving said arm toward the elongated member to grip the plant, by the mutually approaching movement of said handle portions, the tool being slidable on said body part in their longitudinal direction to adjustably held positions.

WILLIAM F. CERVENKA.
FRED MILLER.